Jan. 12, 1960 J. F. WOOD 2,921,145

PHONOGRAPH PICKUP CARTRIDGE CASE AND MECHANISM

Filed Dec. 29, 1954 2 Sheets-Sheet 1

INVENTOR.
John F. Wood
BY Alois W. Graf
Attorneys

PHONOGRAPH PICKUP CARTRIDGE CASE AND MECHANISM

Filed Dec. 29, 1954 2 Sheets-Sheet 2

INVENTOR.

John F. Wood

BY Alois W. Graf

Attorney

United States Patent Office 2,921,145
Patented Jan. 12, 1960

2,921,145

PHONOGRAPH PICKUP CARTRIDGE CASE AND MECHANISM

John F. Wood, Buchanan, Mich., assignor to Electro-Voice, Incorporated, Buchanan, Mich.

Application December 29, 1954, Serial No. 478,229

7 Claims. (Cl. 179—100.41)

This invention relates to a phonograph pickup cartridge case and mechanism, and more particularly to such a device in which the motion of a two position mechanism will provide the selection of the proper reproducing stylus.

One of the objects of this invention is to provide a new and improved phonograph pickup mechanism usable to place a cartridge case in either of two possible predetermined positions.

Another object of this invention is to provide an improved phonograph pickup mechanism for a cartridge case which is simple in design and easy to construct.

A further object of this invention is to provide an improved phonograph pickup mechanism for a cartridge case in which the mechanism actuation means is readily accessible and easy to operate.

A still further object of this invention is to provide an improved phonograph pickup mechanism for a cartridge case which requires a minimum of upkeep and maintenance while at the same time making all its components readily accessible for such maintenance and repair.

Other objects and advantages of the invention will be apparent during the course of the following description when read in connection with the accompanying drawings, wherein.

Figure 1:
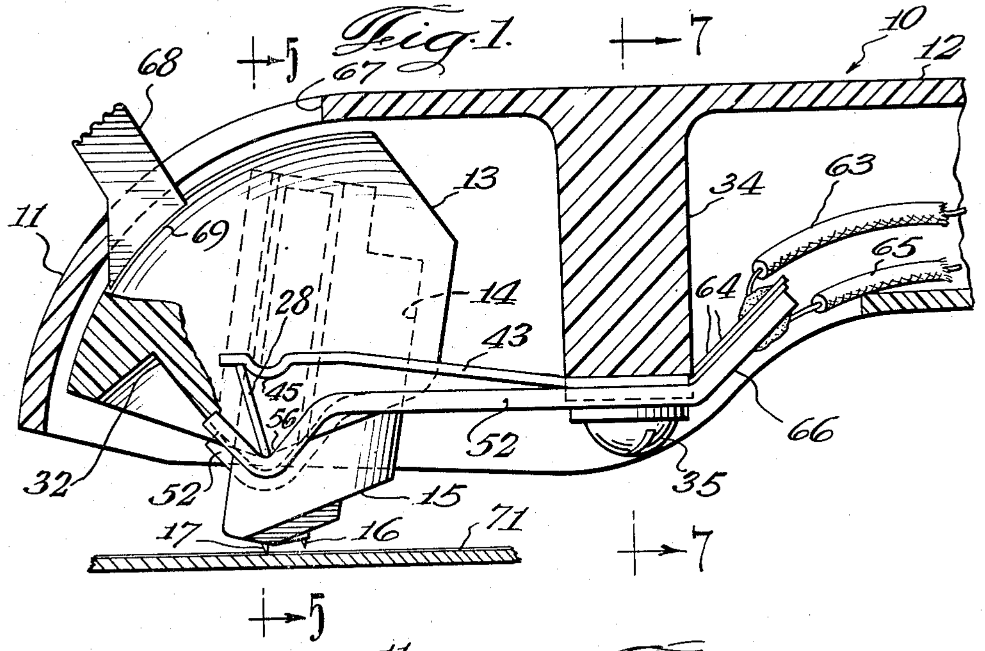
Figure 1 is a sectional view taken on line 1—1 of Figure 3 of the head end of the phonograph pickup arm with the pickup cartridge inserted in its holder.
Figure 3:
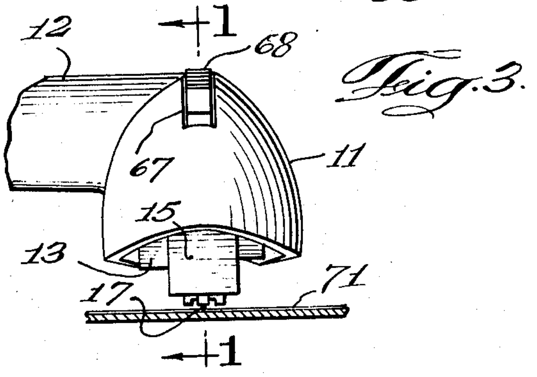
Figure 3 is a front elevational view of the pickup arm with the cartridge inserted in its holder.
Figure 4:
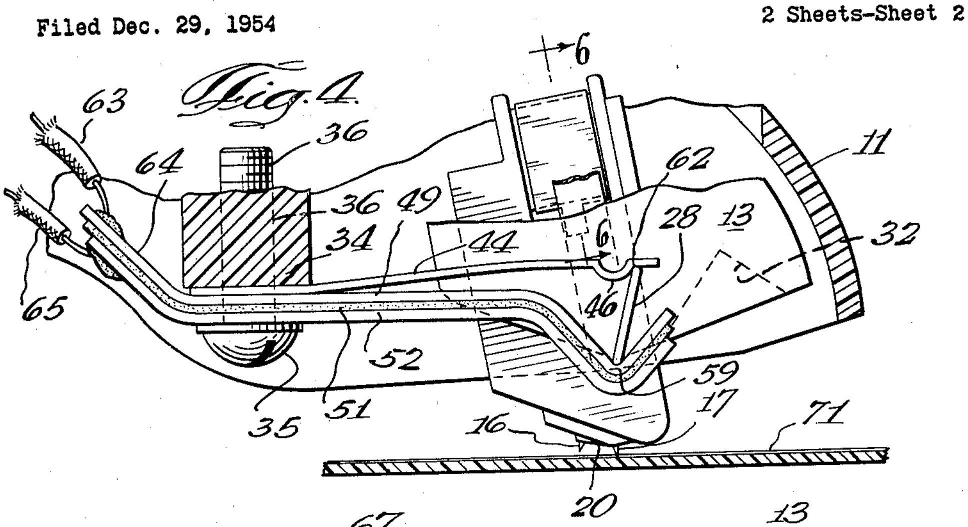
Figure 4 is an enlarged fragmentary sectional view of the head end of the phonograph pickup arm with the cartridge inserted in its holder.

Referring now more particularly to Figures 1 and 4, there is shown a phonograph pickup housing member 10, within which the rest of the structure to be described is contained. The housing member 10 consists of a head end 11 and a base end (not shown) joined in a smooth curve by an arm section 12 (see also Figures 2 and 3).

A cartridge holder 13 in the head end 11 has a cartridge receiving cavity 14 in which is positioned a cartridge 15. The cartridge 15 extends outside the head end 11 of the housing member 10 and has fixed to its lower end two record sensing styli 16 and 17. The one stylus 16 is used for standard speed phonograph records, while the other stylus 17 is used for long playing phonograph records. Both styli 16 and 17 are mounted on a single strip-like supporting element 20 and are so disposed as to cause the same amplitude of crystal movement. This eliminates the need of volume control means in switching from one stylus to the other. The cartridge 15, which is shown in detail in Figure 6, has two clips 18 and 19 on opposite sides of the cartridge body. For further details of the cartridge 15 and its construction, reference is had to the co-pending application of John F. Wood, Serial No. 446,255, filed July 28, 1954, now Patent No. 2,851,541, issued September 9, 1958.

Figure 8:
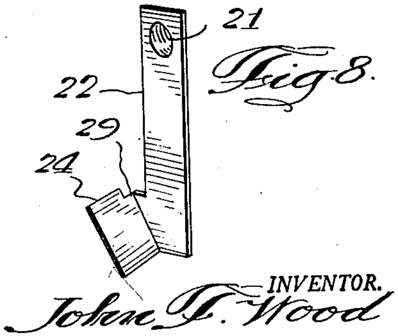
Figure 8 is an isometric view of one of the contact and pivot members used for pivotally mounting the cartridge and its holder, and to provide the electrical connecting means between the cartridge and the holder.

With the cartridge 15 inserted in the cavity 14 of the holder 13, the clip 18 makes contact with a dimpled protrusion 21 of a contact member 22 which is positioned flush with the wall 23 of the cavity 14. The contact member 22 has a pivot member 24 extending at right angles therefrom which extends through the wall 23. A similar clip 19 makes contact with a dimpled protrusion 25 of a contact member 26 which is positioned flush with the wall side 27 of cavity 14 facing the clip 19. A pivot member 28 is connected at right angles to contact 26 and extends through the wall 27 of cavity 14. Thus, the pivot members 24 and 28 extend at right angles to their respective wall sides through the holder 13 and comprise the pivoting axis for the holder. Details of one of the contact and pivot members are shown in Figure 8 showing the small recess 29 which in the assembled structure is positioned where the pivoting surface 24 pierces through the wall side 23. The styli 16 and 17 are electrically connected to provide an output signal across the clips 18 and 19 which will appear through the connection provided by contacts 22 and 26 across pivot members 24 and 28.

Figure 2:
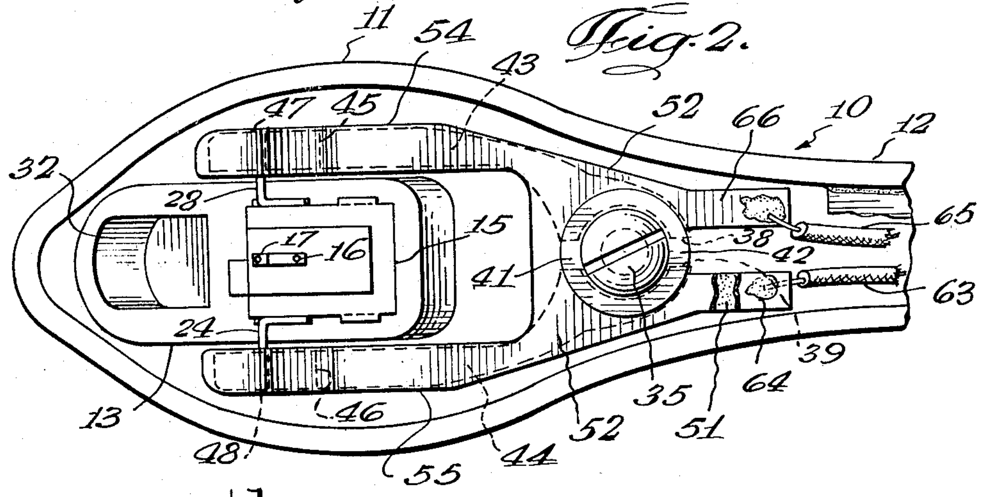
Figure 2 is a bottom view of Figure 1.
Figure 7:
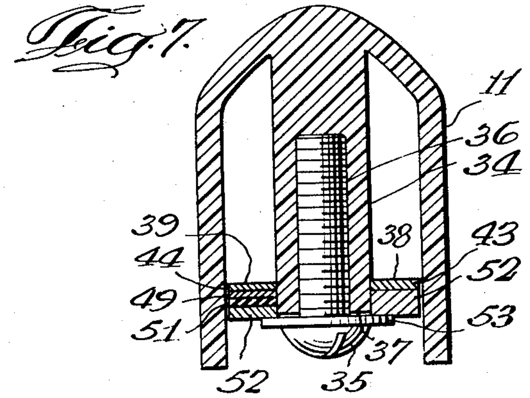
Figure 7 is a sectional view taken on line 7—7 of Figure 1 showing details of the mounting boss arrangement.

A mounting boss 34 is vertically positioned and connected to the housing 10. It may be made of plastic material and an integral part of the housing 10. A mounting bolt 35 is screwed into a tapped hole 36 perpendicular to the face 37 of the mounting boss 34 (see also Figure 7). As shown in Figure 2, the face 37 extends in two ridge-like protrusions 41 and 42 to the edge of the boss 34 and thus splits the face into two separate half-moon like sections 38 and 39 separated at the center by the circular face 37 and near the periphery of the boss by two ridge-like separations 41 and 42 which are just high enough to be flush with a right detent spring 43 and a left detent spring 44.

Detent springs 43 and 44 have respective cylindrical depressions 45 and 46 at their respective movable ends 47 and 48. A contact 49 made of a material such as Phosphor bronze is positioned on top of the left detent spring 44. An insulating strip 51 is positioned to cover the contact 49. A retaining clip 52 is positioned to cover the right detent spring and the left detent spring 44. The stack of detent spring contacts, insulating strip, and retaining clip thus formed is held firmly in position by a washer 53 which is held tightly against the retaining clip by screw 35 which passes through the washer 53 into the mounting boss 34. The retaining clip 52 extends in the form of two arms 54 and 55 at approximately right angles from the mounting boss 34. The one arm 54 is positioned above right detent spring 43, while the other arm 55 is positioned above left detent spring 44.

Figures 5, 6:
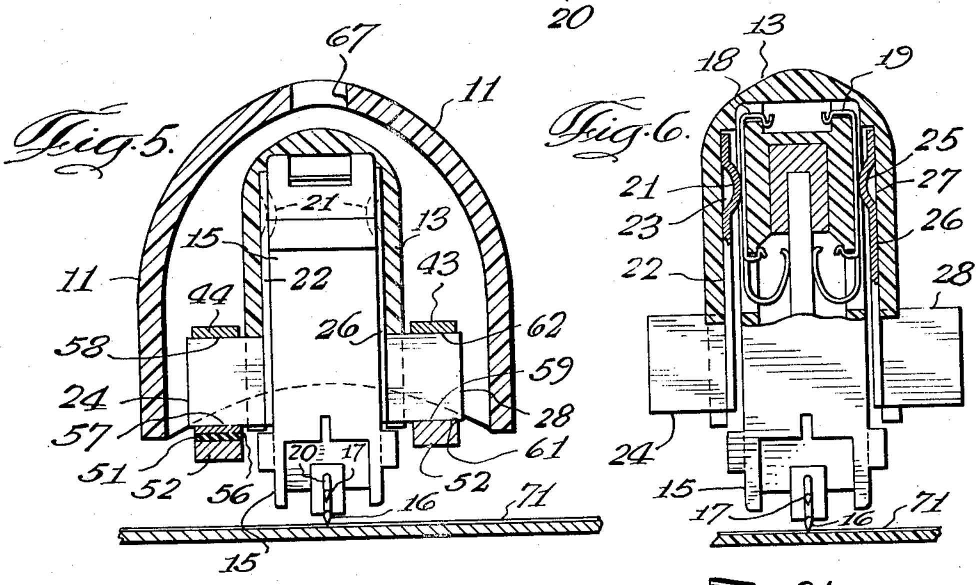
Figure 5 is a sectional view taken on the line 5—5 of Figure 1 showing the holder mounted cartridge and the pivoting arrangement for the holder.
Figure 6 is a fragmentary sectional view of the cartridge and the cartridge holder taken along line 6—6 of Figure 4.

The contact 49 and the insulator 51 are backed up and supported by the retaining clip arm 55, and have a V-shaped depression 56 below the cylindrical depression 46 in the left detent spring 44, as is best shown in Figures 1 and 5. The pivot member 24 of the cartridge holder 15 is positioned at its lower end 57 at the lowest point of the V-shaped depression of contact 49, while its upper edge 58 bears against the lower surface of the left detent spring 44, and as will be explained later bears against this surface on either side of the circular depression 46. The pivot member 28 of the cartridge holder 13 is positioned with its lower edge 59 at the lowest point of a V-shaped depression 61 in the retaining clip arm 54 which is positioned below the cylindrical depression 45 in the right detent spring end 47. The upper end of the pivot member 28 bears against the lower surface of the right detent spring 43 on either side of the cylindrical depression 45, as will be hereafter described.

A lead 63 is connected, such as by soldering, to the end 64 of the contact 49 extending into the arm section 12 of the housing 10. A lead 65 is connected to the end 66 of the retaining clip 52 which also extends beyond the mounting boss 34 into the arm section 12 of the housing 10.

The head 11 has a slot-like aperture 67 aligned with the arm section 12 into the head section 11. The slot divides the head 11 along its length into two symmetrical sections (see Figures 1 and 3). An actuating lever 68 is fixed in a surface depression 69 of the holder 13 and protrudes through the slot-like aperture 67 for free travel in that slot throughout its extent.

In operation, the lever 68 can be flipped to position the holder 13 and its mounted cartridge 15 in one of two positions so as to cause either stylus 16 or stylus 17 to engage the recording surface 71. The two positions of the lever 68 correspond to the two end positions of the slot 67. The lever 68 is held against a given end position until flipped over to the other end position of slot 67 by the cooperative action of the pivot member 24 with the cylindrical depression 46 in the left detent spring 44 and the cooperative action of the pivot member 28 with the cylindrical depression 45 in the right detent spring 43. The depressions 45 and 46 force the respective pivot members 28 and 24 to assume a position on either side of their respective cylindrical depressions, and this action forces the lever 68 against either end of the slot 67, depending on which side of the lowest point of the cylindrical depressions the pivot members are when released by the manual actuating force applied to the lever 68.

As previously explained, the electrical signals picked up by either stylus 16 or 17 appear across the pivot members 24 and 28 and are brought out from there to the respective ends 64 and 66 of the contact 49 and the retaining clip 52 to which are connected the respective leads 63 and 65. The two leads 63 and 65 may then be brought out through the housing base (not shown) to wherever it is desired.

While there has been shown and described an invention in connection with certain specific embodiments, it will, of course, be understood that it is not intended nor desired to be limited thereto since it is apparent that the principles herein disclosed are susceptible of numerous other applications, and modifications may be made in the circuit arrangement and in the instrumentalities employed without departing from the spirit and scope of this invention as set forth in the appended claims.

I claim as my invention:

1. A pivotable cartridge holder in a mounting frame comprising a boss providing two separated sections in said mounting frame, a first detent spring on one of said sections of said boss, a second detent spring on the other of said sections of said boss, a first contact on said second detent spring, an insulator on said first contact, a retaining clip on said insulator and said first detent spring forming a second contact, a first pivoting member between said retaining clip contact and said first detent spring, a second pivoting member between said first contact and said second detent spring, said first and second pivoting members being fixedly positioned in said cartridge holder so as to provide the electrical connecting means between a cartridge in said cartridge holder and mounting frame, and an actuating member connected to said cartridge holder for positioning said holder in either of two positions.

2. The combination comprising a phonograph arm and a cartridge holder pivoted to either of two vertical positions, said cartridge holder having a vertically arranged body provided on opposite sides with transversely projecting electrical contacts, a structure in said arm for pivotally supporting said cartridge holder including a boss, a pair of resilient detent members insulated from each other carried by said boss and projecting therefrom to engage said electrical contacts, a bifurcated resilient retaining clip member carried by said boss, an insulated contact strip carried by one side of said clip member, said contact strip and said clip member engaging said electrical contacts, and means for shifting the cartridge holder from one position to the other.

3. The combination comprising a phonograph arm and a cartridge holder pivoted to either of two vertical positions, said cartridge holder having a vertically arranged body provided on opposite sides with transversely projecting sheet metal electrical contacts, a structure in said arm for pivotally supporting said cartridge holder including a boss, a pair of resilient detent members insulated from each other carried by said boss and projecting therefrom to engage one edge of each of said electrical contacts, a bifurcated resilient retaining clip member carried by said boss, an insulated contact strip carried by one side of said clip member, said contact strip and said clip member engaging the opposite edge of each of said electrical contacts, and means for shifting the cartridge holder from one position to the other.

4. The combination comprising a phonograph arm and a cartridge holder pivoted to either of two vertical positions, said cartridge holder having a vertically arranged body provided on opposite sides with transversely projecting rectangular sheet metal electrical contacts, a structure in said arm for pivotally supporting said cartridge holder including a boss, a pair of resilient detent members insulated from each other carried by said boss and projecting therefrom to engage one edge of each of said rectangular electrical contacts, a bifurcated resilient retaining clip member carried by said boss, an insulated contact strip carried by one side of said clip member, said contact strip and said member having V-shaped depressions engaging the opposite edge of each of said electrical contacts, and means for shifting the cartridge holder from one position to the other.

5. The combination according to claim 3 wherein said electrical contacts carried by said holder extend to the interior thereof to provide sliding contacts for a replaceable phonograph cartridge.

6. An electromechanical transducer comprising a housing open on one side, a phonograph pickup having an axis of elongation disposed in the housing and extending through the open side thereof and having an end exterior to the housing, said pickup having two spaced styli mounted on the end exterior to the housing in a common plane parallel to the axis of elongation of the pickup and two support members within the housing extending from the pickup on an axis normal to the plane of the styli, said members being of rectangular cross-section, means to mount the pickup to the housing including two pair of leaf springs, each pair having a first and a second spring abutting opposite sides of one of the support members, said springs having substantially parallel confronting bends and the support members abutting the first of the springs at the bends therein and the second of the springs adjacent to the bends therein, and a detent mechanism for retaining the support members adjacent to opposite sides of the bends of the second springs.

7. An electromechanical transducer comprising the elements of claim 6 wherein the springs are electrically conducting and the springs abutting one of the support members of the pickup are electrically insulated from the springs abutting the other support member of the pickup.

References Cited in the file of this patent

UNITED STATES PATENTS

| | | |
|---|---|---|
| 2,548,082 | Tourtellot | Apr. 10, 1951 |
| 2,568,671 | Vistain | Sept. 18, 1951 |
| 2,586,362 | Martin | Feb. 19, 1952 |
| 2,699,470 | Koren | Jan. 11, 1955 |

FOREIGN PATENTS

| | | |
|---|---|---|
| 699,397 | Great Britain | Nov. 4, 1953 |